INVENTOR.
ARTHUR BRAMLEY
ATTORNEYS.

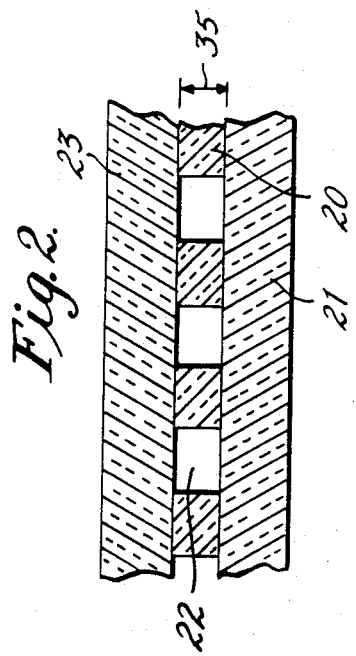
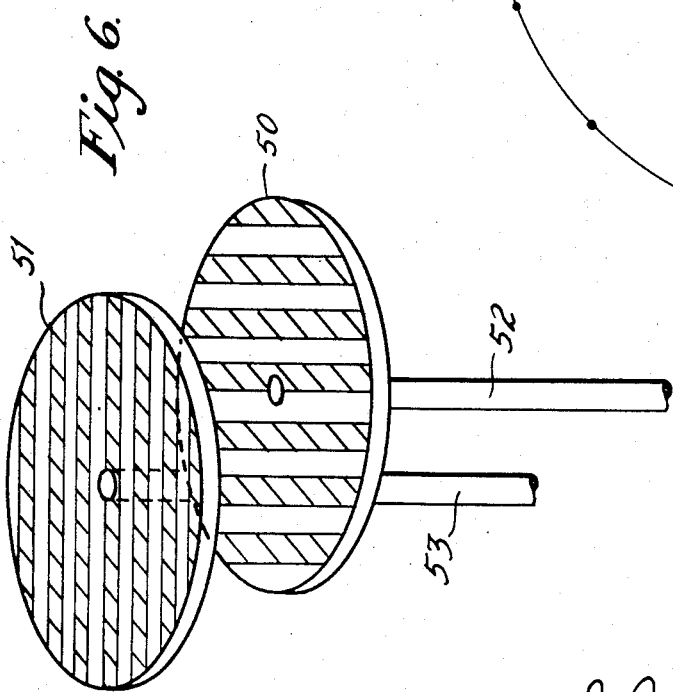
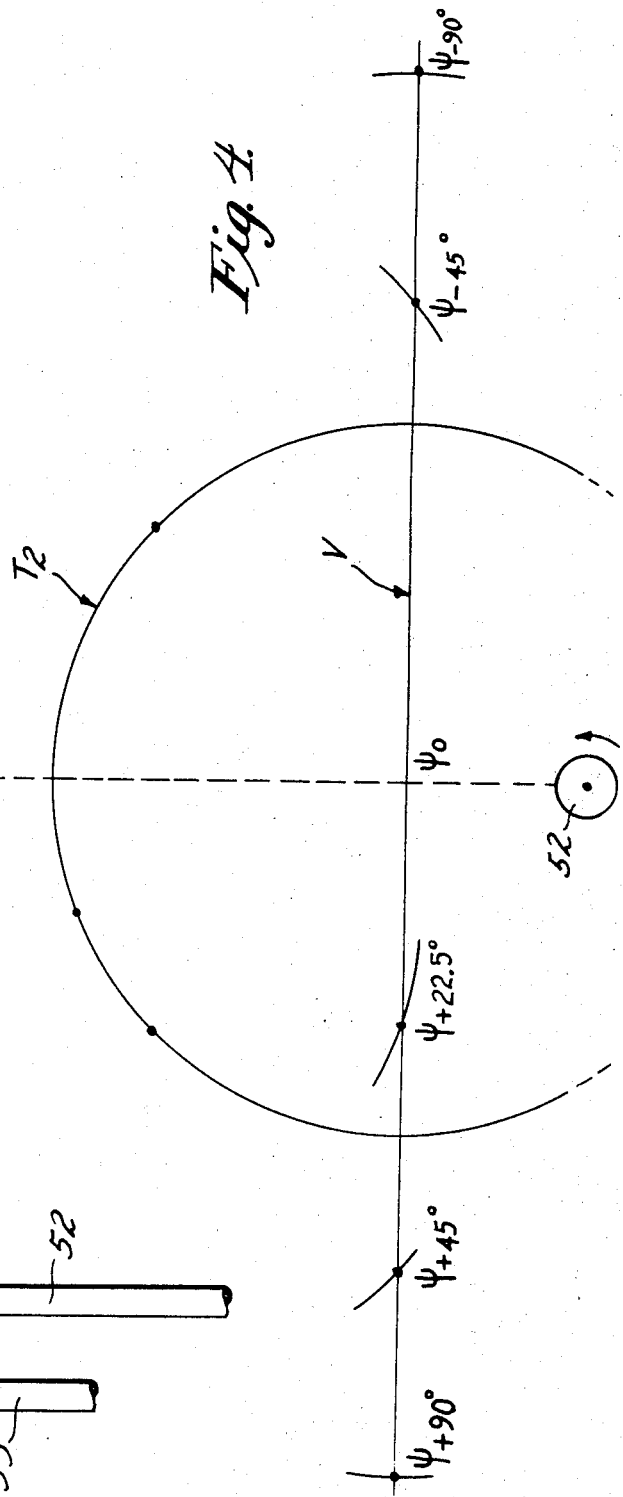
INVENTOR.
ARTHUR BRAMLEY
BY
ATTORNEYS.

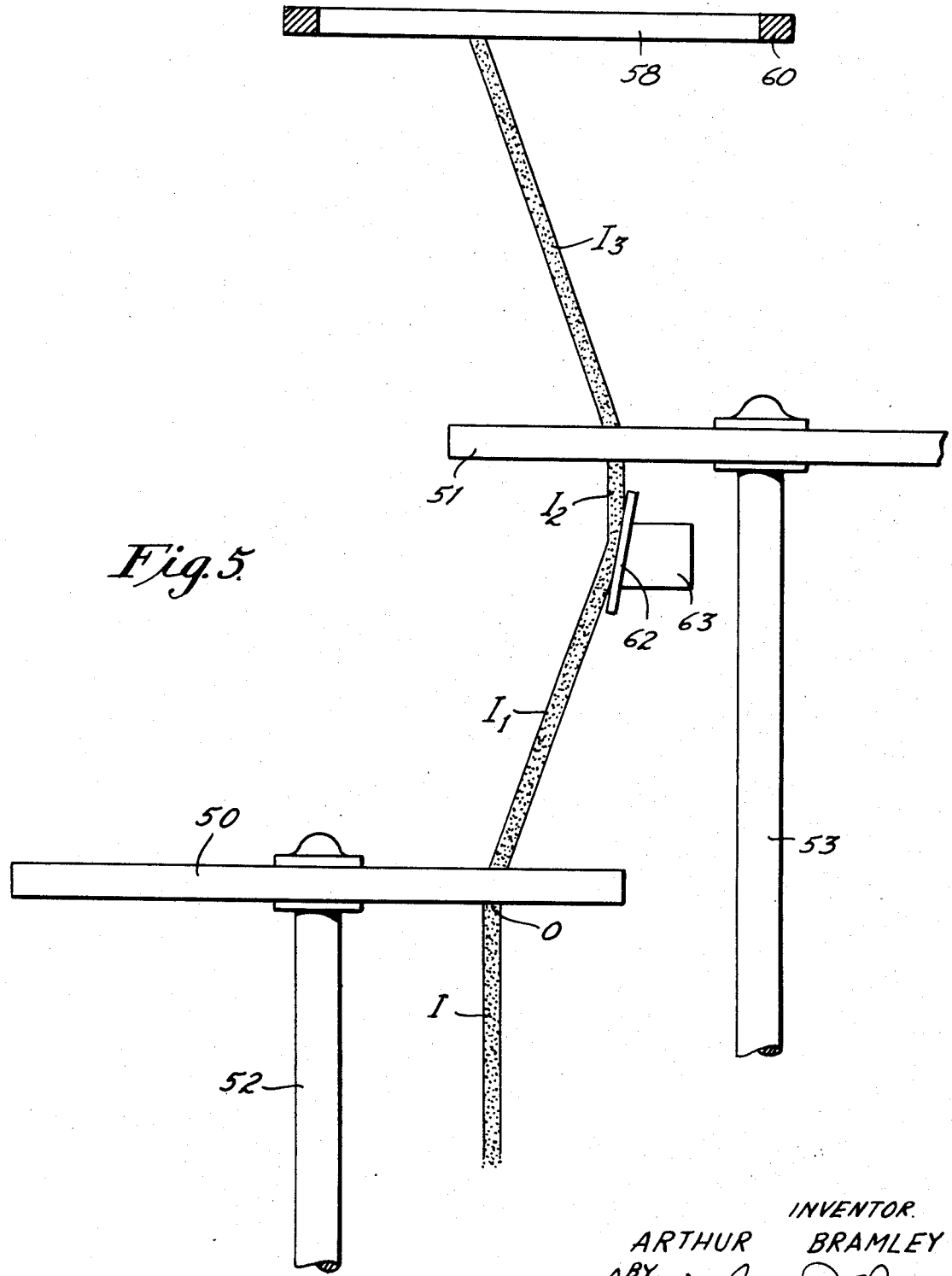

March 20, 1973  A. BRAMLEY  3,721,486
LIGHT SCANNING BY INTERFERENCE GRATING AND METHOD
Filed Jan. 13, 1970  4 Sheets-Sheet 4

INVENTOR.
ARTHUR BRAMLEY
BY
ATTORNEYS

3,721,486
LIGHT SCANNING BY INTERFERENCE GRATING AND METHOD
Arthur Bramley, 7124 Strathmore St.,
Falls Church, Va. 22042
Filed Jan. 13, 1970, Ser. No. 2,486
Int. Cl. G02b 17/00
U.S. Cl. 350—6    15 Claims

ABSTRACT OF THE DISCLOSURE

In producing a time sequential linear scan, light is passed through deflection gratings arranged adjoining one another in parallel planes, each of the gratings having its lines in ordered spacial relationship, preferably being divided into four equal sectors with the lines in each sector parallel. The gratings are moved oppositely while maintaining a position to intercept a light beam. The gratings preferably rotate oppositely on parallel axes. Light is passed through the gratings preferably normal to each of them and traces a linear scan on a viewing screen preferably placed parallel to the planes of the gratings. Mirrors between the gratings deflect the incident light to the second grating so that it is normal thereto on entering. In the preferred form the spacing between the gratings is approximately equal to the spacing between the viewing screen and the nearest grating. In the preferred embodiment each grating consists of two optical flats with grating elements located between them, the spacing of the optical flats being adjustable to change the phase.

DISCLOSURE OF INVENTION

The present invention relates to a system for displaying visually on a screen information presented electrically. This comprises an electronically controlled gating device for modulating the light which constitutes the writing mechanism of the system. The input information is imparted to the light rays by the gating device. A mechanically driven scanner is used for displaying the information input in the modulated light on a viewing screen.

By a deflection grating it is meant a diffraction grating which has the capacity to deflect (bend) a light ray.

A purpose of the invention is to place two deflection gratings in parallel planes adjacent to one another, the gratings having lines of ordered spacial relationship, and to move the gratings oppositely in such a way as to produce a linear time sequential scan on a viewing screen or the like.

A further purpose is to oppositely rotate the gratings on adjacent parallel axes.

A further purpose is to arrange the incident light beam to each of the gratings in a position normal to that grating.

A further purpose is to divide each deflection grating of circular form into four quadrants, the lines on each quadrant being orthogonal.

By a deflection grating which has four quadrants and the lines of each quadrant orthogonal it is meant that the grating is divided into four quadrants, each quadrant having lines which are parallel to one another within itself, and the lines of one quadrant being at right angles to the lines of the adjoining quadrants on each side.

A further purpose is to space the deflection gratings from one another the same distance as the spacing between the viewing screen and the nearest grating.

A further purpose is to control the phase of the deflection gratings by changing the spacing of optical flats on either side of the grating elements.

A further purpose is to utilize an electronically controlled gating device which comprises a light source, a coincident current matrix controlling the light diffracted by the elementary areas of the magneto-optic film assembly, and a lens system for collimating the diffracted light into input rays. The light flux in these rays is modulated by the diffraction properties of the elementary areas as determined by the electrical pulse in the conductor matrix.

Further purposes appear in the specifications and in the claims.

In the drawings I have chosen to illustrate one of the numerous embodiments in which the invention may appear, selecting the form shown from the standpoints of convenience in illustration, satisfactory operation and clear demonstration of the principles involved.

FIG. 2 is a diagrammatic section parallel to the axis showing the adjustment of the phase in a deflection grating according to the invention.

FIG. 4 is a diagrammatic plan view showing the projection of traces of light rays on the plane of the viewing screen from the plane of the second deflection grating.

FIG. 5 is a diagrammatic axial section through the rotating deflection gratings and the viewing screen showing the path of the light ray somewhat exaggerated.

FIG. 6 is a perspective of the deflection gratings according to the invention showing the relation of the lines (apex edges of prisms) on the two gratings.

FIGS. 7 and 8 are not to scale.

Figure 1:
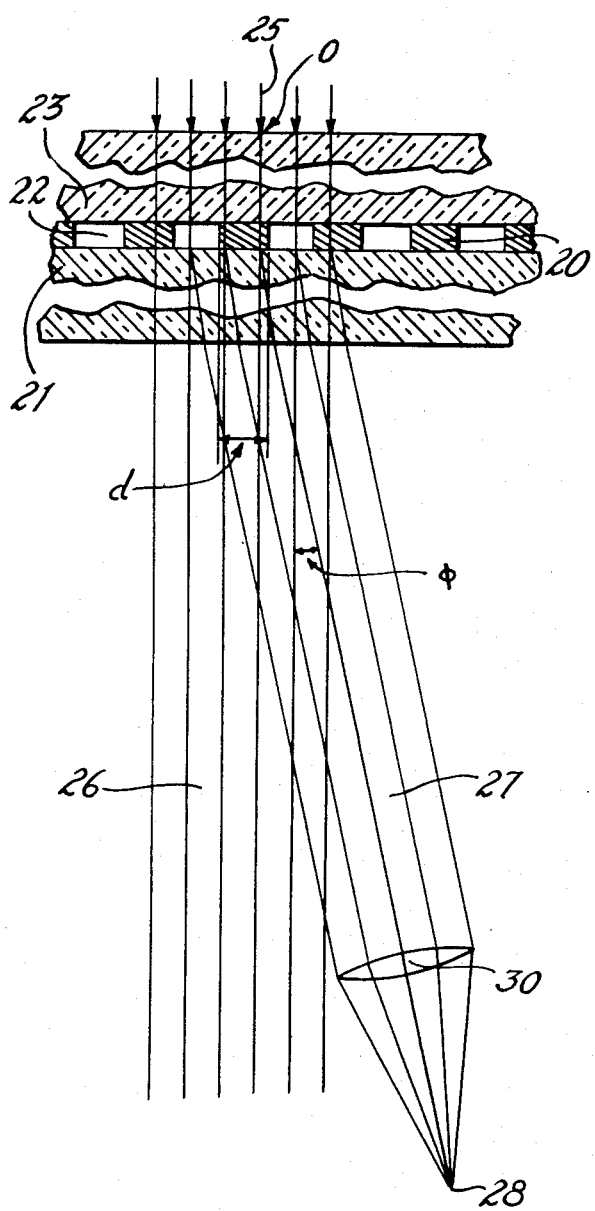
FIG. 1 is a diagrammatic transverse section partially broken away of a deflection grating according to the invention, illustrating the path of the light rays.

The invention relates to the differential control of the phase of light emerging from the rulings of a deflection grating. By light it is intended to include visible light, and also related forms of radiation such as infrared and ultraviolet.

In a famous experiment Young in 1802, Condon and Odishaw Handbook of Physics (1958) pages 6–90, has utilized this principle but so far as known, no device has been produced which is capable of providing a linear scan.

In accordance with the invention two preferably phase controlled deflection gratings rotate relative to each other to achieve a linear scan. In the invention first a circular time sequential scan is provided on a fixed plane such as a viewing screen from a continuous light ray modulated in any suitable manner as by an electric circuit and propagated in a fixed direction.

In a second step, the time sequential circular scan is transformed into a time sequential linear scan onto a second plane which is fixed in position relative to the first plane and to the light ray.

Approximately 20% to 80% of the light flux incident on the device appears in the scanning beam, depending or the miniature structure of the grating.

The electromechanical arrangement of the device is simple. A time sequential deflection of a light beam incident on a viewing screen is achieved by mechanical motion in a time sequence of the physical elements in the system.

In the preferred embodiment the mechanical motion or alteration of the physical elements is accomplished by rotation relative to one another and to the viewing screen of two sets of deflection grating elements oriented in an ordered spacial relationship. The manner of forming the grating elements is not limited, and they can be deposited, etched or ruled on a solid base transparent to the radiation which is to be used to illuminate the viewing screen. The light used for best results should be monochromatic, but it can consist of broad band lines such as are produced by a high intensity arc.

The grating elements may consist of identical elements deposited in an orderly array such as grooves ruled or blocks deposited in the form of prisms or rectangles.

The material of the grating elements should be as highly transparent as practical to the radiation used in the display.

The wave lengths of the radiation used will depend on the region of transparency of the optical flats and the blocks and the region of transparency of the viewing screen. It will also depend upon the mechanical strength of the deflection grating and the ability to produce it in the required configuration with the block form desired. Materials for blocks with infrared radiation may be polycrystalline zinc sulphide in the form of 95% sphalerite and 5% wurtzite by weight (Eastman Kodak Irtan 2). For ultraviolet light quartz satisfies some of the requirements. For visible light optical glass prisms may be used. A compromise of properties must sometimes be chosen.

The form of the grooves or blocks deposited on the surface of an optical flat will be selected to deflect the light in a different direction within a small angular distribution with the greatest radiation flux utilization.

The device can operate from a standard alternating current power source, for example 125 volts at 60 r.p.s., and the retrace time of the system is a very small fraction of the scan time for a complete cycle. Because of these parameters the interference technique is ideally suited for time sequential scannning.

Each of the deflection gratings consists of an orderly array of rectangular or prismatic blocks 20 of transparent material close to a transparent optical flat base plate 21, as shown in FIG. 1 and provided with uniform spacing 22 between the blocks. The rectangular blocks may have generally the same height and width, $d=m\lambda$ where $\lambda$ is the wave length of the light and $m$ is a small integer. The center-to-center spacing between the rectangular blocks should suitably be equal to $2d$. The blocks should extend the entire width of the pattern area on the base plate 21 in order that the grating can accept the light beam incident on the base plate. An optical flat top plate 23 is placed over the array of blocks 20. The two plates 21 and 23 are parallel and make an intimate optical contact with the array of blocks 20 between them. Each of the plates 21 and 23 is shown broken to indicate that in the optimum design the optical length between the blocks may be adjustable as by varying the effective thickness of the spacing between the plates. Although the variation may induce distortion of the ray as it is propagated through the blocks, the effect on the intensity of the defracted beam is minimal. The space 22 between the blocks 20 and the top and bottom plates 21 and 23 may be a vacuum, or it may be filled with air or any other gas which has a refractive index of about 1. The refractive index of the blocks should be as close as possible as that of the plates.

In FIG. 1 the monochromatic incident light ray 25 which is required for sharpest results is taken perpendicular to the plates 21 and 23. If the optical path through the rectangular block differs from the value $s$ through the air gap by an integral multiple of $\lambda$ then after passing through the grating the exit light beam is propagated in the direction of incidence as the central undiffracted beam 26. In this case, the grating acts like an optical flat or parallel glass sheet. If the difference in optical path lengths is an odd multiple of $\lambda/2$, then there is no central beam propagated in the incident direction. The light is propagated at an angle $\phi$ to the normal to the grating as a diffracted light beam 27 in which the following relationship exists:

$$\sin \phi = \lambda/2d$$

This diffracted beam is shown focused at a focus point 28 by condensing lens 30. The exact angle $\phi$ depends on the difference in optical path lengths.

In the general case, the optical properties of the diffracted central beam depend upon the shape of the blocks, their distribution on the optical flat and the fraction of the optical flat area with which the blocks make contact.

Thus, the characteristics performance resulting from this deflection grating, such as contrast and resolution, will depend upon the uniformity of the blocks and their distribution over the optical flat. It is desired to have a deflection grating in which the optical path lengths through the different elements can be adjusted by a built-in phase controller. For a practical device, a fixed, definite and non-adjustable spacing exists between the two plates 21 and 23. Also a conventional diffraction grating may be used, but its efficiency is very low since the light flux in the first order diffracted beam is only a few percent of the light flux incident on the grating.

Treated as an optical component, the rectangular block grating has interesting characteristics. It is transparent and has a light loss equivalent to that of a glass plate, but unlike a glass plate, it does not have to transmit an incident beam without deviation. A light ray incident normally on such a deflection grating may be transmitted as two light rays symmetrical with respect to the incident direction and at an angle of about 10° with respect to that direction. The plane contacting these two rays is normal to the direction of the rulings or lines on the grating.

In the present discussion only one of the two beams generated by the deflection grating is being described since the analysis of the other beam is similar. However, if the specification of the deflection grating and of the incident ray are suitably chosen, then the second ray generated by the grating on the first plate will not enter into the scanning process. The problem does not exist for a phase-controlled grating with the grooves ruled in the form of a prism, which generates only one deflected ray. The prism grating has a further advantage of higher light efficiency. To optimize the performance in this type of grating, the hypotenuse and sides of the prism must be suitably oriented to achieve first order reinforcement of the deflected light beam from each individual prism in the array.

As illustrated in the diagram for a prism set, FIG. 6, the dimensions for height and width of the block for a prism do not need to be restricted to the order of a few wave lengths to be operational. The restriction is necessary in order that the rectangular block set proposed by Young be operational. The prism set has a further advantage. For a small apex angle (thin) prism for which the deflection angle is less than 10°, the rays incident on the face of the prism need only be approximately perpendicular to that surface. The angle of the rays may deviate from the normal at the position O by as much as 2.5°, and the astigmatism still will not distort the image so much as to make it unacceptable. For prisms made of low dispersion material, the light may cover a broad spectrum of wave lengths and still not image adversely on the viewing screen. The cross sketch emphasizes the position of the apex lines (continuous lines of the set of prisms, not the lateral extent of the prisms).

Figure 3:
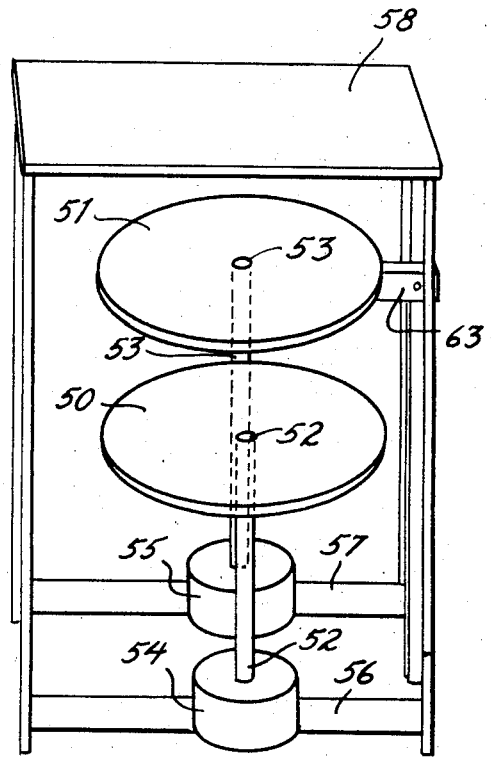
FIG. 3 is a diagrammatic perspective of a device according to the invention.

FIG. 2 illustrates one procedure for making a phase-controlled adjustment of the deflection grating of the invention. Two transparent plates 21 and 23 are relatively adjustable toward and away from one another as suggested by arrow 35. Between the plates air or vacuum exists at 22. The pressure this motion exerts on rectangular blocks 20 changes their thickness. It should be kept in mind that the plates 21 and 23 must have higher tensile and sheer strength and be harder than the compression strength of the material of blocks 20. The compression of the blocks 20 must be within the elastic limit of their material FIG. 3 shows a basic design for a scanner of the present invention. Two different gratings 50 and 51 are respectively in-parallel planes and are mounted on spaced parallel shafts 52 and 53, the deflection gratings being at right angles to the axes of the shafts. The shafts are driven respectively by synchronous motors 54 and 55 mounted on brackets 56 and 57. The shafts 52 and 53 are turned by synchronous motors 54 and 55 at the same angular velocity, but in opposite directions.

In FIG. 5 is considered the case where a light beam I is propagated in the plane defined by the axes of the shafts 52 and 53 in a direction parallel to these axes and between them so that it impinges at right angles on the plane of the first deflection grating plate 50 at a spot O (FIG. 1).

If instead of a single position O at which a single light beam I impinges on the plane of the first deflection grating plate 50, a multiplicity of parallel but individual light rays, I, $I_1$, $I_2$ . . . $I_N$ impinge on the plane defined by the first deflection grating plate 50 at positions O, $O_1$, $O_2$ . . . $O_N$, then on the viewing screen 58 supported by a frame 60 will appear a multiplicity of parallel but individual scan lines which may be designated V, $V_1$, $V_2$ . . . $V_N$. The separation between the scan lines will be determined by the separation between the sequence of positions O, $O_1$, $O_2$ . . . $O_N$ at which the individual light rays I, $I_1$, $I_2$ . . . $I_N$ impinge on the plane of the first diffraction grating plate 50.

Whatever the distribution of rays impinging on the plane defined by deflection grating plates 50 or 51, the design of the mounts 52 and 53 supporting the gratings must be such that the mounts do not interfere or distort the path of the light rays impinging on the deflection gratings either before, during or after the rays impinge on the gratings.

Since the grating plates 50 and 51 are in parallel planes as shown in FIG. 3, a ray normal to grating plate 50 at O after passing through it in the course of a complete scan will describe a circle $T_2$ in the plane of the grating plate 51 as shown in FIG. 4. The grating plate 51 transforms the circular scan into a linear scan. Stated in other words, the light ray after deflecting by the grating 51 traces a straight line V from $\psi-90°$ to $\psi+90°$ on the viewing screen 58, frosted glass or other device used as shown in FIG. 4. The plane of the viewing screen 58, FIG. 5, is parallel to the planes of the grating plates 50 and 51, and the spacing between deflection grating plate 51 nearest to the viewing screen and the viewing screen 58 is the same approximately as that between deflection grating plates 50 and 51 in the preferred embodiment.

With such a simple design, there is no difficulty in making a complete line scan in 16.1 microseconds, the period of a conventional synchronous motor turning at 3600 r.p.m. The loss of light due to failure to utilize the alternate deflected central beam gives an overall light efficiency of the order of 20% for a rectangular block grating.

A stationary mirror device 62 mounted on a bracket 63 as shown in FIG. 5 intercepts the exit light beam after it leaves the rotating grating plate 50 and before it enters the rotating grating plate 51, so that the deflected beam $I^1$ will be turned at right angles to the second deflection grating plate 51 at the time it impinges on this element. For a 2 inch scan line the spacing between deflection grating plates in the preferred embodiment is about 5 inches and there is adequate space to incorporate the mirror device 62 and its support 63 without interfering with the path of the light rays as shown in FIG. 5.

It will be evident that the length of the scan line is proportional to the distance between the two grating plates 50 and 51. For maximum simplicity in the structure, the spacing between plates 50 and 51 is the same as the spacing between plate 51 and the viewing screen 58. These dimensions while not critical are illustrative of dimensions which are being selected to produce a certain length of scan lines.

In FIG. 5 the position of the deflection grating plates 50 and 51 is chosen so that the direction along the length of the blocks is perpendicular to the plane in this section. Mirror 62 shown is illustrative of the various mirrors which will deflect the light rays to make the incident ray to the second grating plate normal. Of course the distance between the gratings must be adjusted if mirrors are used, to allow for the change in the length of the light path. The incident ray I after being deflected by the first grating 50 is designated $I^1$, and after encountering the mirror the ray is designated $I^2$. After passing through the second grating plate the ray is designated $I^3$. Thus the viewing raster is that produced by the beam $I^3$ on the vewing screen 58.

In the optical arrangement of FIG. 5, a prism type grating is used which generates only one deflected beam. If a phase-controlled rectangular grating is used, then only one of two light rays generated in the grating is illustrated as mentioned above.

Although the scanned pattern forms a straight line between its end points $\psi+90°$ and $\psi-90°$, FIG. 4, the time sequence is closely linear only between $\psi+45°$ and $\psi-45°$. In the other sections, the bits are bundled together. The notation $\psi\pm$ gives the orientation of the grating lines on deflection grating plate 50 at the position O of incidence of the light beam with respect to the scanned line. At the position $\psi-90°$ and $\psi+90°$, the grating lines on the second grating plate 51 are parallel to those on the first deflection grating plate 50, but perpendicular to the scan line. At the position $\psi$ the grating lines on the grating plates 50 and 51 are parallel to each other and to the scan line as shown in FIG. 5. At the position $\psi+45°$ the grating lines on the first deflection grating plate 50 make an angle of 45° with respect to the scan line. At this point the grating lines on the second deflection grating plate 51 are perpendicular to those on the first deflection grating plate 50.

From the construction of the assembly, the other angle can be readily determined. To make the scanning approximately linear with respect to time through the entire cycle, the trace after reaching the position $\psi+45°$, must fly back to the position $\psi-45°$. This can be readily achieved if the deflection grating plates 50 and 51 are divided into four equal sectors with lines in adjoining sectors mutually orthogonal.

Various other ways may be used for improving the linearity in time of the scan line between the positions $\psi+90°$ and $\psi-90°$. For the embodiment with a prism grating on the plates 50 and 51, the apex angle of the set of prisms on each plate can be varied at different points to compensate for the non-uniformity in the scan as the shafts rotate. In another technique, the time cycle of the modulation controlling the inputs I, $I_1$, $I_2$ . . . $I_N$ can be adjusted so that the information is fed into the inputs at a non-linear rate to compensate for the non-uniformity of the slow speed scan.

The term plane is use to designate a geometrical surface fixed in space. Whether or not the element generating the plane is rotating or goes through some other form of motion is not pertinent to the present inquiry. Here the plane fixed in space is defined as the surface generated by any line on the blocks 20 of FIG. 1 contacting the surface of the optical flat base plate. In this connection, the term "line" means the line formed by the intersection of the surfaces of the rectangular block 20 of FIG. 1 with the surface of the optical flat, or if the blocks 20 are prisms, the term line is taken to mean the apex edge of the prism. The surface of the optical flat base plate of each of the deflection grating plates, is oriented so that any line in it is perpendicular to the direction of its axis of rotation. The viewing screen 58 is perpendicular to the axes of rotation of the shafts 52 and 53.

The arrangement provides $N+1$ simultaneous inputs I, $I_1$, $I_2$ ... $I_N$ into the system, giving rise to a two-dimensional display on the viewing screen 58. Within the time interval $\Delta t$ at any time $t$, a light ray from the multiplicity of light rays $I_1$, impinges on the screen 58 along the trace $V_i$. To make a real time display, the information impinging on each trace $V_i$ on the viewing screen 58 must be characteristic of that trace and not, in general, common to all. This can be achieved by supplying to each of the inputs I, $I_1$, $I_2$ ... $I_N$ information characteristic of that instant. If this is to result in a real time display, the time $T_y$ to complete a trace on the viewing screen 58 along any one trace $V_i$, must be selected as the slow speed scan time of the two-dimensional display. If there are $N+1$ traces on the viewing screen 58, the high speed scan trace time must be designated as:

$$\Delta T = T_y/(N+1)$$

and the high speed spot time interval $= T_y/(N+1)^2$ sec. for a square raster.

The light flux impinging at the time $t$ on any one of the set of $N+1$ traces within the time interval $$T = T_y/(N+1)$$

should be proportional to the light flux incident on that portion of the display within the same time interval. Thus for any given time interval $\Delta T$, which represents the high speed trace time at $t$, the light flux in a line perpendicular to the set of trace $V_i$ will be proportional to the distribution of radiation along a high speed scan line in that direction. This means that within the interval $\Delta T$ at the time $t$, the light flux in any of the input beams, I, $I_1$, $I_2$ ... $I_N$ must be modulated according to the light distribution along a fast scan line within that time interval.

In case the information is to be displayed over a large area by a square display raster or a rectangle display raster with an aspect ratio near 1, say 3:4, the mechanical design can be improved over that shown in FIG. 1. To cut down on the overall dimensions of the device, the deflection grating plates 50 to 51 may be supported and driven from their outer rim, as by hollow gears on hollow bearings. In this arrangement the inputs I, $I_1$, $I_2$ ... $I_N$ can extend along a diagonal starting close to the mechanical arrangement supporting and driving the plate at the rim. Of course no shaft will be located in the center. A square two-dimensional display on the viewing screen 58 has been mentioned, but the display is not limited to this, but may be any single geometrical design consistent with the scanner method. For displaying alpha-numerical characters in a linear array, a rectangular raster would be required in which there are $N+1$ simultaneous inputs I, $I_1$, $I_2$ ... $I_N$. A suitable value for N is 23.

In the preferred embodiment the system for generating the scan inputs I, $I_1$, $I_2$ ... $I_N$ to the rotating plate 50 was a magneto-optic grating. Many other techniques may be used, such as a resonant, high frequency moving mirror, or multielement non-resonant piezoelectrically driven mirrors, or a digital light beam deflector. In general these methods require that the information be presented to the fast scan lines time sequentially. In order to achieve high brightness, the data for any one scan line should be presented for the whole time of the fast scan $\Delta T = T_y/(N+1)$ for a square raster, where $T_y$ is the time to trace the slow scan. This can be achieved electronically if the data for the fast scan line is stored for one fast scan period as it is presented. Then in the fast scan period, the light flux for all input rays, e.g. $N+1$ for a square raster, is modulated for the whole period of the fast scan line to the value given by the stored data for each position. It is not practical to position a conventional modulator in each of the input rays I, $I_1$, $I_2$ ... $I_N$. A common method, which utilizes the Pockels effect in an electro-optic crystal, such as KDP, is bulky and requires moderately high voltages to operate it.

One method for utilizing the fast scan electronic storage of the data, is to couple the electronic system to a conductor matrix used for coincident current writing on a magneto-opic gating. This device should be inserted in the input ray assembly so as to modulate the light flux in the ray $I_i$ incident at the position $O_i$ on the gating plate 50. This is done by adjusting the currents in the printed circuits controlling the magnetic domains in the thin magnetic films.

Figure 8:
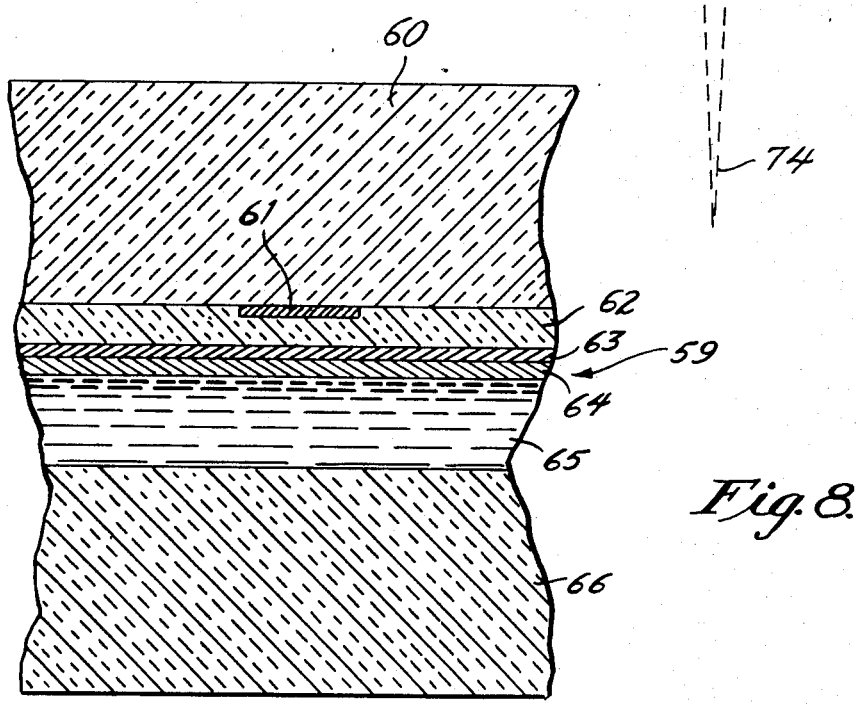
FIG. 8 is an enlarged diagrammatic cross section of the magneto-optical film assembly and coincident current matrix shown in FIG. 7.

In one embodiment a magneto-optic gating 59, as shown in FIG. 8, has an insulating layer 60, such as quartz, and on its surface a matrix of copper coincident conductors 61, suitably of the order of 0.001 inch thick and 0.020 inch wide, with suitable spacing between them. An insulating layer 62 covers the conductors 61 and suitably has a thickness below the conductors of the order of 0.003 inch. On the insulating layer 62 is a thin layer 63 of gold, suitably vapor deposited in a vacuum. On the gold layer is placed a magnetic film 64 such as NiFe which is only about 0.003 inch from the current matrix. A layer 65 of a colloidal aqueous suspension of Bitter's solution ($Fe_3O_4$) is placed on the magnetic film so that it can be oriented by the magnetic domains in the magnetic films. A cover glass 66 holds the Bitter's solution in place. Suitably fabricated and processed, these films and their associated layers of Bitter's solution can now control the phase relations of the light incident on the assembly. Thus the diffracted light is adjusted by the current in the conductor matrix. The light flux from a conventional high power lamp incident on the film assembly is thus modulated. This, in turn, modulates the light rays I, $I_1$, $I_2$ ... $I_N$ at the positions O, $O_1$, $O_2$ ... $O_N$. To achieve this result, the film assembly is broken up into separate strip areas, A, $A_1$, $A_2$ ... $A_N$. Each strip $A_i$ diffracts the light towards only one particular input position $O_i$ and no other. The coincident current matrix, which drives such an arrangement, must be in registry with the strips.

Figure 7:
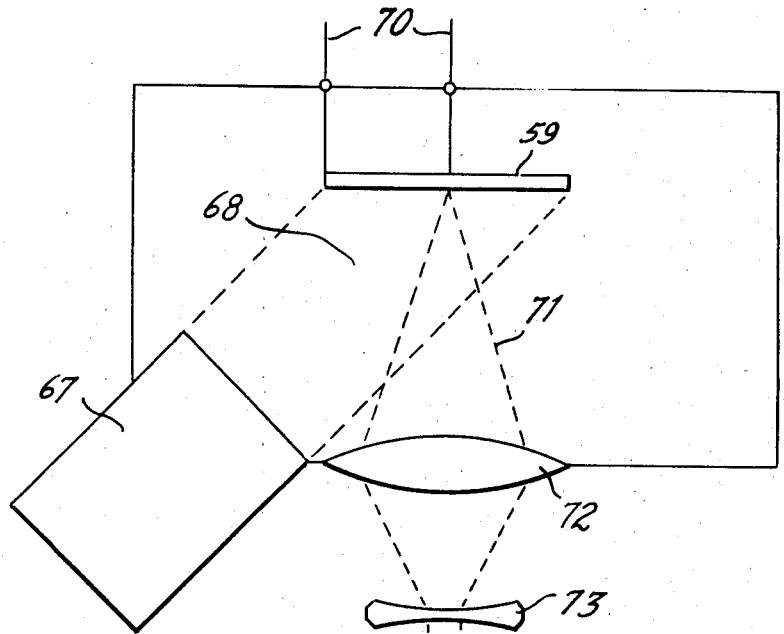
FIG. 7 is a diagrammatic section showing the path traced by the light through the electronically controlled gating device.

The diagram of the reflected diffracted light system, FIG. 7, shows a cross section through the initial stage of the optical system which generates the input rays I, $I_1$, $I_2$ ... $I_N$. The section is taken perpendicular to the plane of the magnetic film. A lamp 67 projects a light beam 68 on the magneto-optic gating 59, controlled by electrical leads 70 to drive the current matrix. A diffracted light beam 71 passes through lens 72 and 73 to produce a light ray 74 which enters the deflecting grating 50 previously described at points O as ray I.

In view of my invention and disclosure, variations and modifications to meet whim or particular need will doubtless become evident to others skilled in the art, to obtain all or part of the benefits of my invention without copying the structure and process shown, I therefore, claim all such insofar as they fall within the reasonable spirit and scope of my claim.

Having thus described my invention what I claim as new and desire to secure by Letters Patent is:

1. In mechanism for producing a time sequential linear scan, a pair of transmission phase deflection gratings each having the capacity to bend light and arranged adjacent to one another in parallel planes, the lines of each deflection grating being straight and parallel to the other lines in that area and oriented at a different angle from the lines in another area of the same grating, means for relatively moving the gratings in opposite directions while they are in position to intercept input light rays, viewing screen means located parallel to the gratings in line therewith and means for passing a single light ray from an object through the gratings to the viewing screen, the result being a time sequential linear scan of the object.

2. In mechanism for producing a time sequential linear scan, a pair of transmission phase deflection gratings each having the capacity to bend light arranged adjacent to one another in parallel planes, each grating having in one area lines straight and parallel to other lines in that area and arranged at a different angle from the lines in the same grating in another area, means for rotating the gratings in opposite directions on parallel axes, viewing screen means located parallel to the gratings in line therewith and means for passing a single input light ray from an object generally normal to the first deflection grating and through both gratings to the viewing screen means, the result being a time sequential linear scan of the object.

3. Mechanism of claim 2, in combination with deflection mirror means interposed in the path of the light beam between the two deflection gratings to render the incident light beam approximately normal to the second grating.

4. Mechanism of claim 3, in which each deflection grating is divided into four equal sectors, the lines within each sector being parallel to one another and the lines in each sector being at right angles to the lines within each adjacent sector on either side thereof, thereby producing a time sequential linear scan.

5. Mechanism of claim 4, in which the spacing between the deflection gratings is approximately equal to the spacing between the viewing screen means and the deflection grating nearest to it.

6. Mechanism of claim 5, in which at least one grating essentially consists of two parallel optical flats and grating elements between them, in combination with means for adjusting the spacing between the optical flats.

7. Mechanism of claim 2, in which each deflection grating is divided into four equal sectors, the lines within each sector being parallel to one another and the lines within each sector being at right angles to the lines within adjoining sectors on either side thereof.

8. Mechanism of claim 2, in which the spacing between the deflection gratings is substantially equal to the spacing between the viewing screen means and the grating which is nearest to it.

9. Mechanism of claim 2, in which at least one of the deflection gratings essentially consists of two parallel optical flats and grating elements between them in combination with means for adjusting the spacing between the two optical flats.

10. A process for producing a time sequential linear scan, which comprises passing a ray of light through two parallel spaced transmission phase deflection gratings having the capacity to bend light, having lines straight and parallel to one another within the same space of the same deflection grating, said ray of light coming from a single object and the deflection gratings having in different areas around the circumference lines which are at a different angle from lines in other areas around the circumference, and relatively moving the deflection gratings with respect to one another around parallel axes while they remain in parallel planes.

11. A process of claim 10, which comprises relatively moving the deflection gratings with respect to one another by oppositely rotating them on parallel axes.

12. A process of claim 11, which comprises passing the beam of light through each deflection grating approximately normal to that deflection grating.

13. A process of claim 10, which comprises passing the ray of light through each deflection grating with the incident ray of light approximately normal to each deflection grating.

14. A process of claim 10, in which the transmission phase deflection grating is made up of arrays of light-transmitting rectangular blocks between optically flat light-transmitting surfaces and at least one of the deflection gratings is adjusted in phase by bringing the optically flat light-transmitting surfaces closer together and thus reducing the distance between opposite surfaces of the light-transmitting rectangular blocks.

15. A process of claim 12, in which the transmission phase deflection grating is made up of arrays of light-transmitting rectangular blocks between optically flat light-transmitting surfaces and at least one of the deflection gratings is adjusted in phase by bringing the optically flat light-transmitting surfaces closer together and thus reducing the distance between opposite surfaces of the light-transmitting rectangular blocks.

References Cited
UNITED STATES PATENTS

| | | | |
|---|---|---|---|
| 3,347,614 | 10/1967 | Fuller et al. | 350—162 |
| 2,938,378 | 5/1960 | Canada et al. | 350—272 |
| 3,510,223 | 5/1970 | Lohmann | 350—162 |
| 1,927,754 | 9/1933 | Robinson | 178—7.6 |

FOREIGN PATENTS

| | | | |
|---|---|---|---|
| 874,462 | 5/1960 | Great Britain | 350—162 |

DAVID SCHONBERG, Primary Examiner

M. J. TOKAR, Assistant Examiner

U.S. Cl. X.R.

350—162 R, 285, 160 R, 112